United States Patent [19]
Hamakawa et al.

[11] Patent Number: 6,075,731
[45] Date of Patent: Jun. 13, 2000

[54] MEMORY CONTROL APPARATUS HAVING DATA RETENTION CAPABILITIES

[75] Inventors: Akira Hamakawa; Kazuya Sugita, both of Tokyo, Japan

[73] Assignee: Mitsubishi Denki Kabushiki Kaisha, Tokyo, Japan

[21] Appl. No.: 09/330,220

[22] Filed: Jun. 11, 1999

[30] Foreign Application Priority Data

Jan. 21, 1999 [JP] Japan ................................ 11-013449

[51] Int. Cl.⁷ ..................................................... G11C 7/00
[52] U.S. Cl. ............... 365/196; 365/230.09; 365/230.06; 365/189.01
[58] Field of Search ............................ 365/196, 189.04, 365/230.06, 230.09, 189.01

[56] References Cited

U.S. PATENT DOCUMENTS

| | | | |
|---|---|---|---|
| 5,276,856 | 1/1994 | Norsworthy et al. | 395/550 |
| 5,764,591 | 6/1998 | Matsui et al. | 365/233.5 |
| 5,901,103 | 5/1999 | Harris, II et al. | 365/226 |

FOREIGN PATENT DOCUMENTS

| | | |
|---|---|---|
| 62-128097 | 6/1987 | Japan . |
| 8-297987 | 11/1996 | Japan . |
| 9-320300 | 12/1997 | Japan . |

*Primary Examiner*—David Nelms
*Assistant Examiner*—Thong Le
*Attorney, Agent, or Firm*—Burns, Doane, Swecker & Mathis, LLP

[57] ABSTRACT

A first sense amplifier reads from a first memory cell array at a normal equilibrium point between a read-"0" operation and a read-"1" operation. A second sense amplifier detects data dissipation by reading data at an equilibrium point higher than the normal equilibrium point, from a second memory cell array provided for detection of data dissipation and having the same characteristic as the first memory cell array. An interrupt control circuit issues an interrupt request to a CPU so as to stop its operation. Subsequently, in response to an instruction from a memory overwrite control circuit, a write/read/erasure control circuit overwrites data stored in the first memory cell array.

9 Claims, 13 Drawing Sheets

MEMORY CONTROL APPARATUS HAVING DATA RETENTION CAPABILITIES

BACKGROUND OF THE INVENTION

1. Field of the Invention

The present invention generally relates to memory control circuits and, more particularly, to a memory control circuit capable of preventing programs and data written in a memory from being damaged due to data dissipation so that a written memory content remains intact. Throughout the following description, a memory and an entirety of a control circuit associated therewith will simply referred to as a memory control circuit.

2. Description of the Related Art

An ideal electrically write-enabled and erasable non-volatile memory maintains data "1" and "0" intact for an unlimited period of time. In reality, however, data ("0" and "1") written in such a memory may undergo time-dependent alteration due to a defect in a manufacturing process or the like.

FIG. 15 shows a construction of a memory control circuit according to the related art. Referring to FIG. 15, the memory control circuit comprises a CPU 1 for performing a predetermined process, a data bus 2 for transferring data, an address bus 3 for transferring address data, an address latch signal generation circuit 4 for generating an address latch signal, an address latch 5 for latching the address data 102 from the address bus 3 in response to the address latch signal.

Referring again to FIG. 15, the memory control circuit also comprises a memory cell array 6 for storing data necessary for the CPU process, a word line decoder 7 for selecting word lines of the memory cell array 6 by decoding the address data 102 provided thereto, a selector decoder 8 for decoding the address data 102 for selection of bit lines of the memory cell array 6, a bit line selector 9 for selecting one of bit lines of the memory cell array 6 in response to the decoding by the decoder 8, and a sense amplifier 10 for reading data in the memory cell array 6.

Referring again to FIG. 15, the memory control circuit further comprises a data latch 11 for temporarily storing data 103 (write data or command data), a command latch 12 for temporarily storing command data 104, a command decoder 13 for decoding the command data 104 and outputting a decode signal 105 and a memory control signal generation circuit 14 for generating a memory control signal 106 for a write operation, a read operation and an erasure operation, in accordance with the decode signal from the command decoder 13, and outputting a clock generation request signal 107.

Referring again to FIG. 15, the memory control circuit also comprises a clock generation circuit 15 for outputting a clock signal 108 to the memory control signal generation circuit 14 in response to the clock generation request signal 107 from the memory control signal generation circuit 14, and frequency-dividing an external clock signal 109 so as to output a clock signal 110 to the CPU 1, and a write/read/erasure control circuit 16 for controlling data 111 to be written to, read from and erased in the memory cell array 6 via the sense amplifier 10. The write/read/erasure control circuit 16 outputs the data 103 from the data latch 11 to the sense amplifier 10 and delivers the data 111 read from the sense amplifier 111 to the data bus 2 as data 112.

FIG. 16 shows a memory read characteristic of the memory control circuit according to the related art. The power supply voltage of the sense amplifier 10 is plotted horizontally and the memory threshold level of a representative cell in the memory cell array 6 is plotted vertically. Referring to FIG. 16, numeral 201 indicates a threshold level of the memory that at which a read-"0" operation is ensured, 202 indicates an equilibrium point between the memory threshold level for the read-"0" operation and a memory threshold level for a read-"1" operation, 203 indicates the threshold level of the memory at which a read-"1" operation is ensured, and 204 indicates a curve connecting equilibrium points of the threshold levels of the memory at respective power supply voltages of the sense amplifier 10.

When data is read from the memory cell array 6, the memory control signal generation circuit 14 generates the memory control signal 106 in response to the decode signal 105 from the command decoder 13 and outputs the same to the write/read/erasure control circuit 16. The address latch 5 stores the address data 102 retrieved from the address bus 3 in accordance with the address latch signal 101 from the address latch signal generation circuit 4 and delivers the address data 102 to the word decoder 7 and the selector decoder 8.

A memory unit in the memory cell array 6 is selected in the form of a combination of the bit line selected by the bit line selector 9 in response to the address data 102 supplied to the selector decoder 8 and a word line determined by the word line decoder 7. The write/read/erasure control circuit 16 receives the memory control signal 106 for a read operation and commands the sense amplifier 10 to read data in a designated memory unit.

The sense amplifier 10 makes a determination as to whether the read data is "1" or "0". As shown in FIG. 16, the sense amplifier 10 reads data "0" in a cell having a high threshold level 201 and reads "1" in a cell having a low threshold level 203. The read data is transferred from the sense amplifier 10 to the write/read/erasure control circuit 16 so that the write/read/erasure control circuit 16 outputs the data 112 to the data bus 2.

If the threshold level of a memory cell is at the equilibrium point between two points at which the sense amplifier 10 reads "1" and "0", respectively, determination of the data is unstable. For this reason, a write operation and a read operation in each of the memory cells in the memory cell array 6 is controlled so that the threshold level of the memory cell is removed from the characteristic curve 204.

If the memory cell array 6 has a defect produced in the process of fabrication, the threshold level 201 of the memory cell, which causes the sense amplifier 10 to perform a read-"0" operation, may drop gradually to the threshold level 202, causing the sense amplifier to perform a read-"1" operation. Such a phenomenon is known as data dissipation. In the memory control circuit according to the related art, the sense amplifier 10 continues to perform a normal read operation in the presence of data dissipation. As a result, the wrong data 112 is output to the data bus 2, causing malfunction of peripheral devices connected to the data bus 2.

The memory cell control circuit according to the related art is not provided with means for detecting data dissipation and determining whether data read from the memory cell array 6 differs from the original data. Lack of such means may cause malfunction of the CPU 1 and the peripheral devices taking wrong data.

One approach to eliminate the above-described problem is disclosed in Japanese Laid-Open Patent Application 9-320300 "SEMICONDUCTOR MEMORY DEVICE" and Japanese Laid-Open Patent Application 8-297987 "NON- VOLATILE SEMICONDUCTOR MEMORY DEVICE". According to these disclosures, data read at different read voltages are compared to each other so as to detect data dissipation. When data dissipation is detected, rewriting of data is performed. One disadvantage of such approaches is that, for detection of data dissipation, two data read operations are required in addition to normal data processing.

SUMMARY OF THE INVENTION

Accordingly, a general object of the present invention is to provide a memory control circuit in which the aforementioned disadvantage is eliminated by providing the memory control circuit with data retention capabilities.

Another and more specific object of the present invention is to provide a memory control circuit that includes a memory cell array dedicated to detection of data dissipation, in addition to a main memory cell array for storing programs and data. Data dissipation is detected before wrong data is output from the main memory cell array. When data dissipation is detected, an interrupt process for rewriting of data is performed so that the reliability of the data stored in the memory cell array is improved.

The aforementioned objects can be achieved by a memory control circuit comprising: a CPU for executing a predetermined process; a first memory cell array storing data necessary for the predetermined process executed by the CPU; a first sense amplifier reading the data stored in the first memory cell array at a first equilibrium point between a read-"0" operation and a read-"1" operation; a write/read/erasure control circuit for controlling a data write operation, a data read operation and a data erasure operation in the first memory cell array; a second memory cell array having the same characteristic as the first memory cell array and storing predetermined data; a second amplifier for reading the data stored in the second memory cell at a second equilibrium point higher than the first equilibrium point so as to detect data dissipation; an interrupt control circuit for outputting to the CPU an interrupt signal for suspending the predetermined process executed by the CPU, when the second amplifier detects data dissipation; an automatic address generation circuit for successively generating addresses in the first memory cell array; and a memory overwrite control circuit for causing the automatic address generation circuit to generate the addresses in the first memory cell array when the second sense amplifier detects data dissipation, causing the write/read/erasure control circuit to overwrite each of the addresses generated by the automatic address generation circuit using data read from the same addresses by the first sense amplifier, canceling the interrupt signal provided by the interrupt control circuit, and resuming the predetermined process of the CPU.

In further accordance with the invention, the write/read/erasure control circuit writes predetermined data in the second memory cell array when the second sense amplifier detects data dissipation.

According to this aspect of the invention, data dissipation is detected in advance of reading of wrong data from the first memory cell array by reading data from the second memory cell array at an equilibrium point higher than that of the sense amplifier for the first memory cell array. In response to the detection of data dissipation, the first memory cell array is overwritten. In this way, the reliability of the data stored in the memory cell array is improved without having to stop the operation of the entirety of the memory control circuit.

In further accordance with the invention, the memory overwrite control circuit comprises a sequence ROM.

Accordingly, the reliability of the data stored in the memory cell array is improved using a simple construction, by constructing the memory overwrite control circuit of the sequence ROM.

In further accordance with the invention, the interrupt control circuit outputs the interrupt signal to an external peripheral device.

By causing the interrupt control circuit to output the interrupt signal to the external peripheral devices, the external peripheral devices are capable of stopping their operation or executing an interrupt process appropriately.

In further accordance with the invention, at power-on, the memory overwrite control circuit prevents the CPU from starting its operation and data dissipation is detected by causing the automatic address generation circuit to successively generate addresses in the second memory cell array and causing the second sense amplifier to read data from the second memory cell array, whereupon the memory overwrite control circuit performs a memory overwrite process in the first memory cell array and the second memory cell array, and wherein when the memory overwrite process is completed, the memory overwrite control circuit instructs the CPU to start its operation.

According to this aspect of the invention, when the second sense amplifier detects data dissipation by reading data from the second memory cell array at a relatively high equilibrium point, the data in the first memory cell array is overwritten. In this way, waste of the CPU power in unnecessary data processing is prevented and the reliability of the data stored in the first memory cell array is improved.

In further accordance with the invention, when the second sense amplifier detects data dissipation while the CPU is executing a first process, the interrupt signal from the interrupt control circuit causes the CPU to save statuses of its registers and shift from the first process to a second process in which the CPU stops its operation, so that the memory overwrite control circuit performs a memory overwrite process in the first memory cell array, and wherein when the memory overwrite process is completed, the interrupt control circuit cancels the interrupt signal so that the CPU restarts its operation and the register statuses are restored in respective registers, so that the CPU returns from the second process to the first process.

According to this aspect of the invention, when data dissipation is detected while a main program is being executed, the CPU saves the status of the registers at that point of time and suspends its operation. After the memory overwrite process is completed, the CPU resumes its operation and stores the saved status in the registers before returning to the main program. In this manner, the reliability of the data stored in the first memory cell array is improved without changing the operating condition of the memory control circuit when data dissipation is detected.

The memory control circuit of the invention may further comprise an input/output terminal freezing circuit for freezing a connection status that occurs at an input/output terminal with respect to an external peripheral device, when the second sense amplifier detects data dissipation, and wherein the interrupt control circuit causes the input/output terminal freezing circuit to stop freezing the input/output terminal, when the memory overwrite control circuit cancels the interrupt signal.

By fixing the connection status of the input/output terminal 51 with respect to the external peripheral device, the reliability of the data stored in the first memory cell array is improved without changing the connection status with respect to the external peripheral device that obtains when data dissipation is detected.

The memory control circuit of the invention may further comprise a data comparator for comparing, when the second sense amplifier detects data dissipation, first data read by the first sense amplifier at the first equilibrium point from an address in the first memory cell array, with second data read by the first sense amplifier at a third equilibrium point higher than the first equilibrium point from the address, and wherein when the first data differs from the second data, the memory overwrite control circuit instructs the write/read/ erasure control circuit to write the first data in the address.

According to this aspect of the invention, when the second sense amplifier detects data dissipation, the data that the first sense amplifier reads from the address in the first memory cell array at the normal equilibrium point is compared with the data that the first sense amplifier reads from the same address at an equilibrium point higher than the normal equilibrium point. Upon determination that the data differ, the data read at the equilibrium point is overwritten only in those cells in which data dissipation is likely to occur. In this way, the reliability of the data stored in the first memory cell array is improved.

In further accordance with the invention, when the second data has disagreeing bits that are different from corresponding bits in the first data, the memory overwrite control circuit instructs the write/read/erasure control circuit to overwrite the disagreeing bits with the corresponding bits.

According to this aspect of the invention, the combined advantage of improving the reliability of the data stored in the first memory cell array and preventing degradation of the first memory cell array is obtained. The latter advantage results from performing a bit-by-bit overwriting operation at those addresses that exhibit data dissipation and by preventing unnecessary write pulses from being applied to the other addresses.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

A description will now be given of various embodiments of the present invention.

First embodiment

Figure 1:
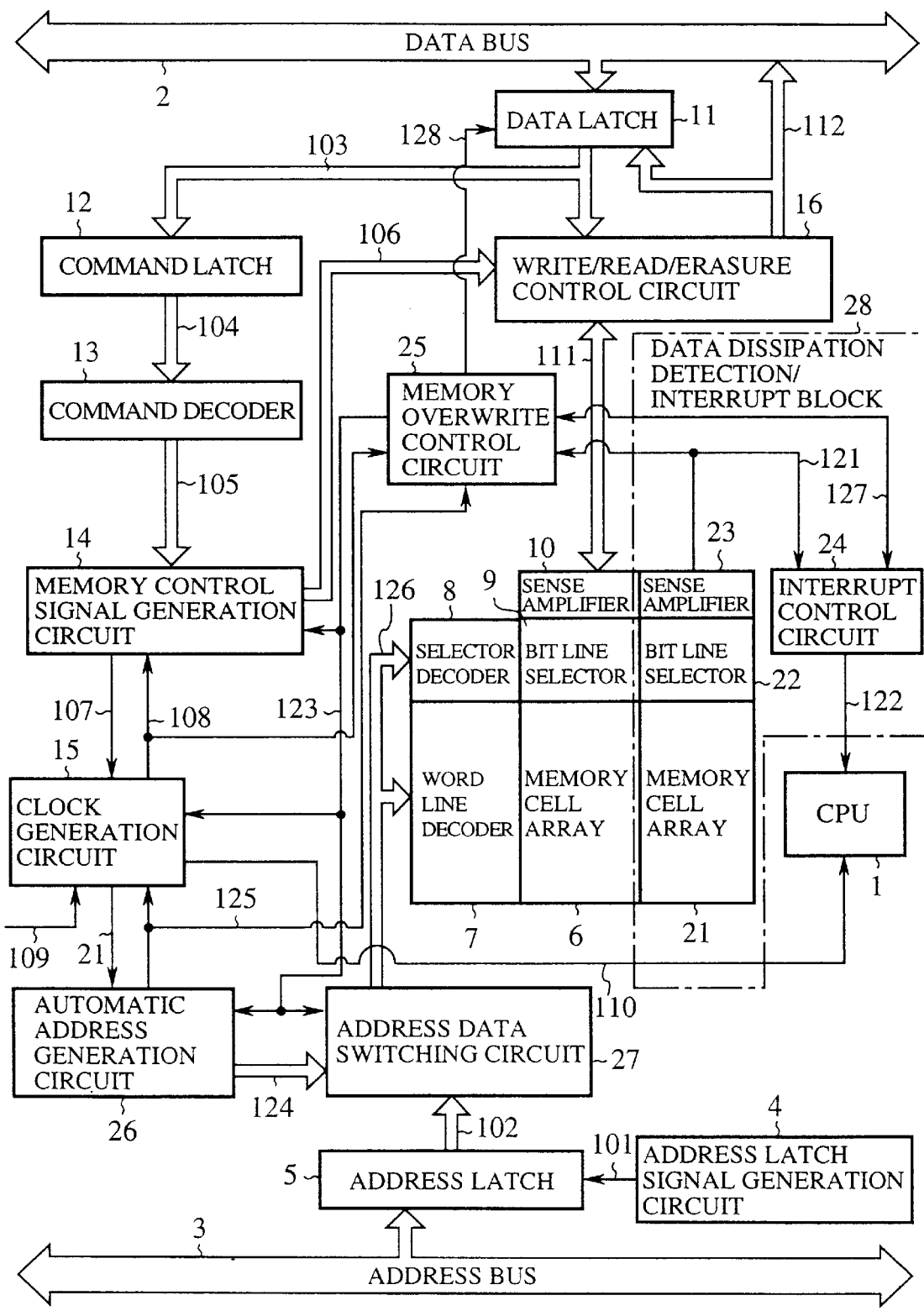
FIG. 1 shows a construction of a memory control circuit according to a first embodiment of the present invention.

FIG. 1 shows a construction of a memory control circuit according to the first embodiment of the present invention. Like reference characters refer to corresponding parts throughout the drawings. Referring to FIG. 1, the memory control circuit comprises a memory cell array 21 (second memory cell array) having the same characteristic as the memory cell array 6 (first memory cell array) and provided for detection of data dissipation, a bit line selector 22, comprised of the same circuit as the bit line selector 9, for selecting a bit line of the memory cell array 21 determined by the selector decoder 8, and a sense amplifier (second sense amplifier) 23 for reading data from the memory cell array 21 and outputting a data dissipation detection signal 121 when data dissipation is detected. The bit line selector 22 is constructed of the same circuit components as the bit line selector 9.

Referring again to FIG. 1, the memory control circuit also comprises an interrupt control circuit 24 for controlling an interrupt operation and outputting an interrupt signal 122 to the CPU 1, in accordance with the data dissipation detection signal 121 from the sense amplifier 23. Numeral 28 indicates a data dissipation detection/interruption block comprising the bit line selector 22, the sense amplifier 23 and the interrupt control circuit 24.

Referring also to FIG. 1, the memory control circuit further comprises a memory overwrite control circuit 25 for outputting a memory overwrite control signal 123 (a read request signal 123a, a write request signal 123b, a clock generation request signal 123c and an automatic address generation request signal 123d) in accordance with the data dissipation detection signal 121 from the sense amplifier 23, so as to control a data overwrite process in the memory cell array 6. The memory overwrite control circuit 25 receives an interrupt process acknowledge signal 127a from the interrupt control circuit 24 and ouputs an interrupt process release request signal 127b to the interrupt control circuit 24. The memory overwrite control circuit 25 outputs a data latch request signal 128 to the data latch 11.

Referring again to FIG. 1, the memory control circuit also comprises an automatic address generation circuit 26 for incrementing addresses in the memory cell array 6 starting at the head thereof, in accordance with the memory overwrite control signal 123 from the memory overwrite control circuit 25, so as to automatically generate address data 124. While the address data 124 is being generated, the automatic address generation circuit 26 continues to output confirmation address data 125, indicating that the address data 124 is being automatically generated, to the clock generation circuit 15 and the memory overwrite circuit 25. The memory control circuit further comprises an address data switching circuit 27 for switching, in response to the memory overwrite control signal 123d from the memory overwrite control circuit 25, from the address data 102 stored in the address latch 5 to the address data 124 automatically generated by the automatic address generation circuit 26. The address data output from the address data switching circuit 27 is referred to as address data 126.

Figure 2:
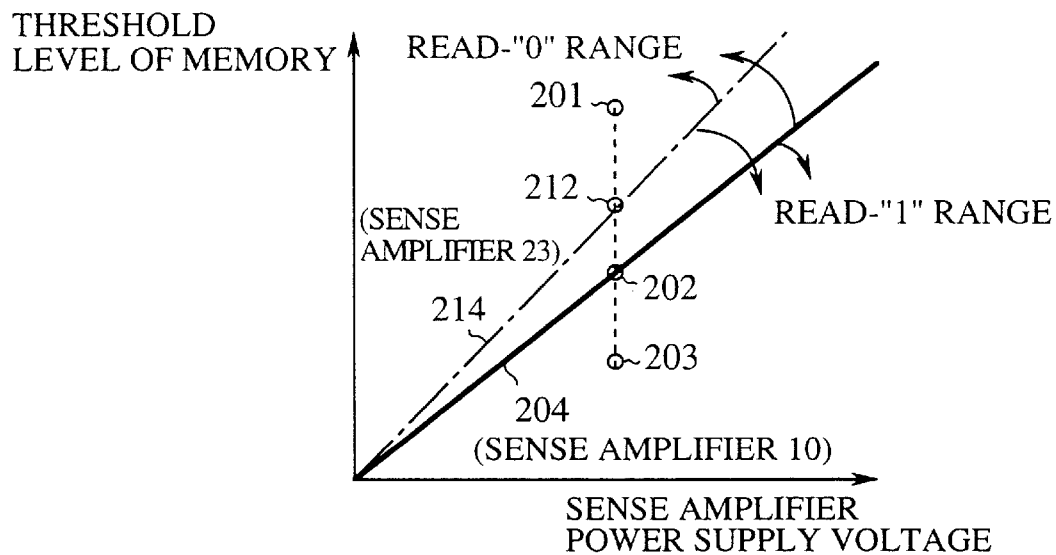
FIG. 2 shows a memory read characteristic of the memory control circuit according to the first embodiment.
Figure 16:
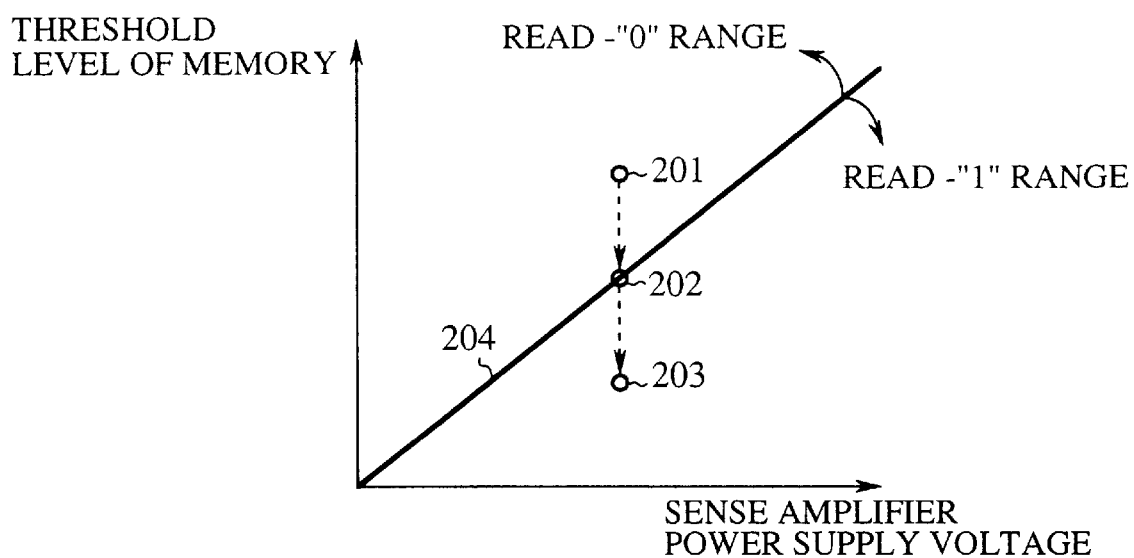
FIG. 16 shows a memory read characteristic of a memory control circuit according to the related art.

FIG. 2 shows a memory read characteristic of the memory control circuit according to the first embodiment. Referring to FIG. 2, numeral 212 indicates a equilibrium point between the threshold level producing a read-"0" operation of the sense amplifier 23 and the threshold level producing a read-"1" operation of the sense amplifier 2. Numeral 214 indicates a characteristic curve connecting the equilibrium points at respective power supply voltages of the sense amplifier 23. The other aspects of the read characteristic are the same as the corresponding aspects shown in FIG. 16. The solid line indicates the characteristic of the sense amplifier 10 (first sense amplifier) and the chain-dotted line indicates the characteristic of the sense amplifier 23. As shown in FIG. 2, the equilibrium point is controlled by controling the power supply voltage of the sense amplifiers 10 and 23.

Figure 3:
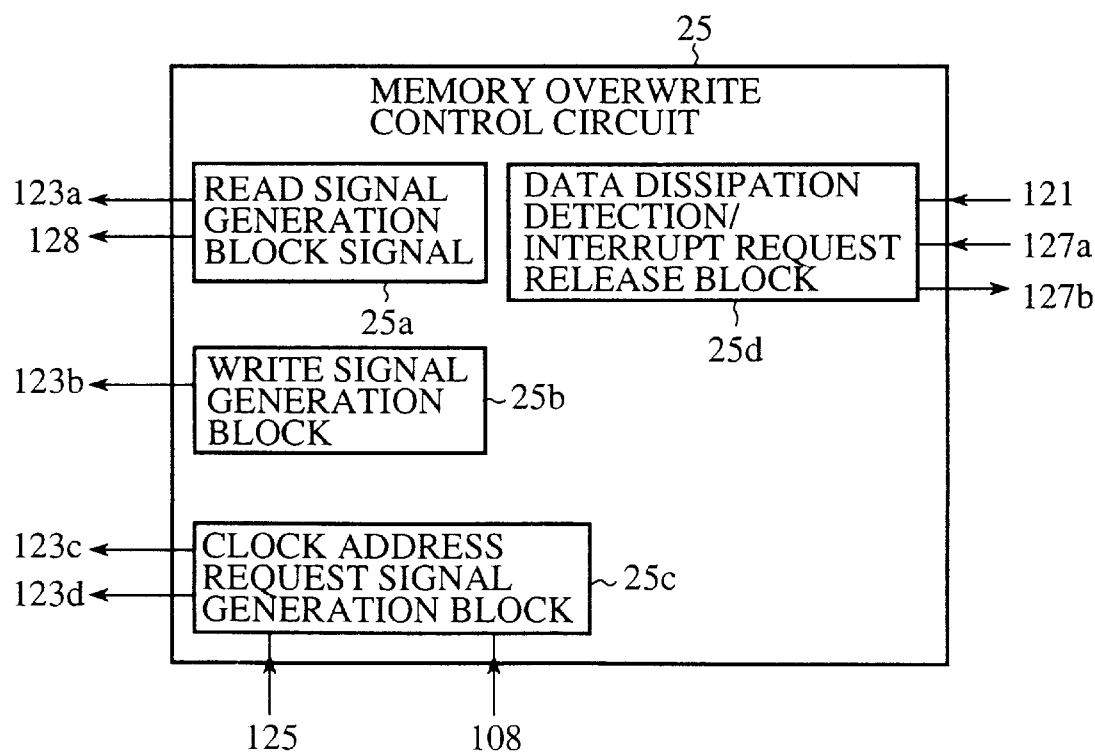
FIG. 3 shows a contruction of a memory overwrite control circuit according to the first embodiment.

FIG. 3 shows a construction of the overwrite control circuit 25 of FIG. 1. Referring to FIG. 3, the overwrite control circuit 25 comprises a read signal generation block 25a for outputting the read request signal 123a to the memory control signal generation circuit 14 and outputting the data latch request signal 128 to the data latch 11 in order to latch data. The overwrite control circuit 25 also comprises a write signal generation block 25b for outputting a write request signal 123b to the memory control signal generation circuit 14.

Referring again to FIG. 3, numeral 25c indicates a clock/address request signal generation block for outputting the clock generation request signal 123c to the clock generation circuit 15 and receiving the clock signal 108 from the clock generation circuit 15. The clock/address request signal generation block 25c also outputs an automatic address generation request signal 123d to the automatic address generation circuit 26 and the address data switching circuit 27. The clock/address request signal generation block 25c acknowledges generation of the automatically generated address by receiving the confirmation address data 125 from the automatic address generation circuit 26.

Referring again to FIG. 3, reference numeral 25d indicates a data dissipation/interrupt request release block. The data dissipation/interrupt request release block 25d enters a memory overwrite process mode upon receipt of the data dissipation detection signal 121 from the sense amplifier 23. The data dissipation/interrupt request release block 25d receives the interrupt process acknowledge signal 127a from the interrupt control circuit 24 and outputs the interrupt process release request signal 127b to the interrupt control circuit 24.

A description will now be given of the operation of the memory control circuit according to the first embodiment.

As indicated by the characteristic curve 214 of FIG. 2, the equilibrium point of the sense amplifier 23 between the read-"1" operation and the read-"0" operation is controlled to be higher than that of the sense amplifier 10. Since the memory cell array 6 and the memory cell array 21 have the same characteristic, proneness to data dissipation is deemed to be the same for both memory cell arrays 6 and 21. The read operation in the memory cell array 6 is performed in a manner known in the art. However, reading from the memory cell 21 is not controlled by the write/read/erasure control circuit 16. For this reason, the read operation by the sense amplifier 23 occurs without regard to the read operation in the memory cell array 6.

Figure 4:
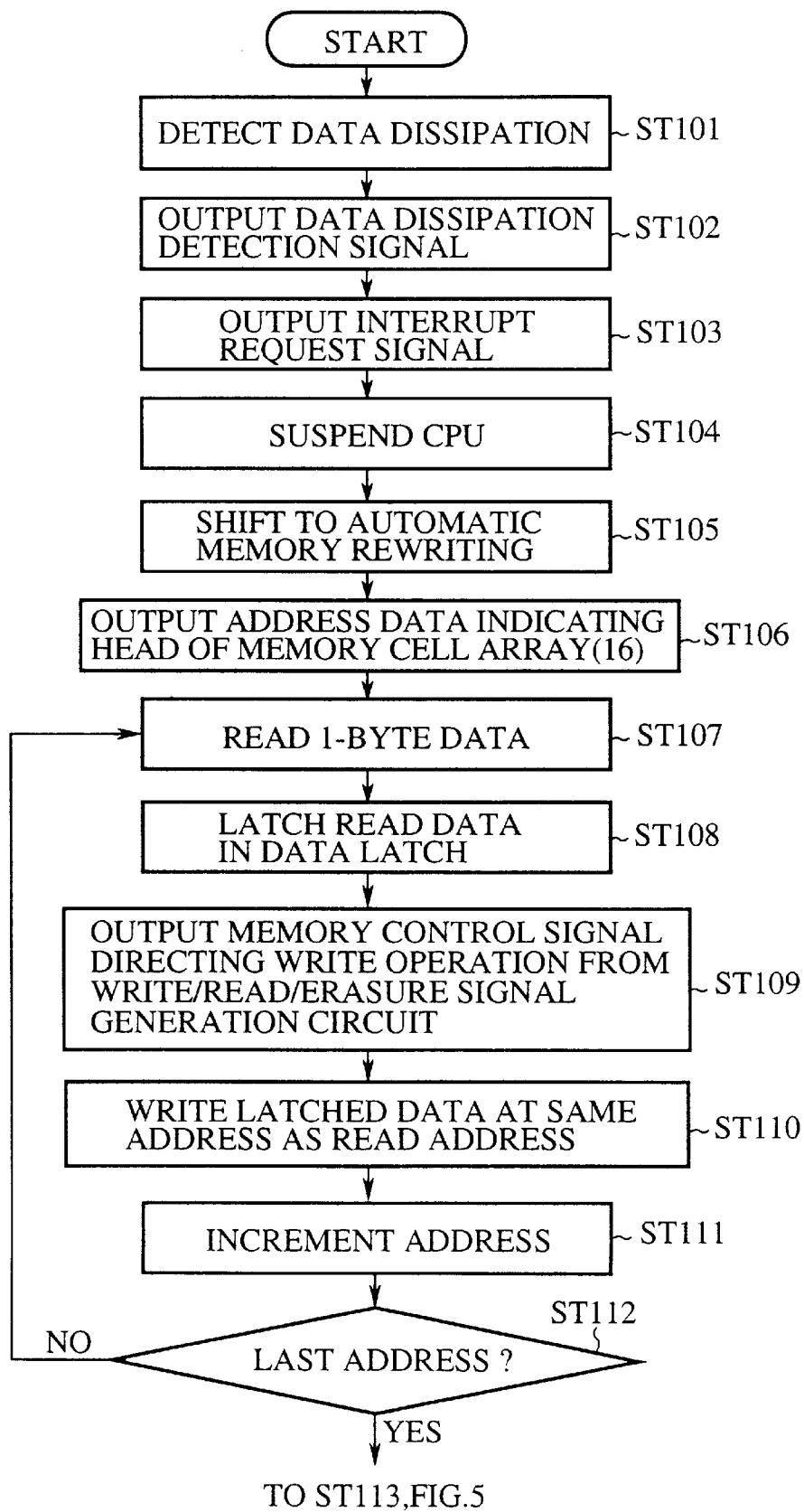
FIG. 4 is a flowchart showing a memory overwrite process performed when data dissipation is detected according to the first embodiment.
Figure 5:
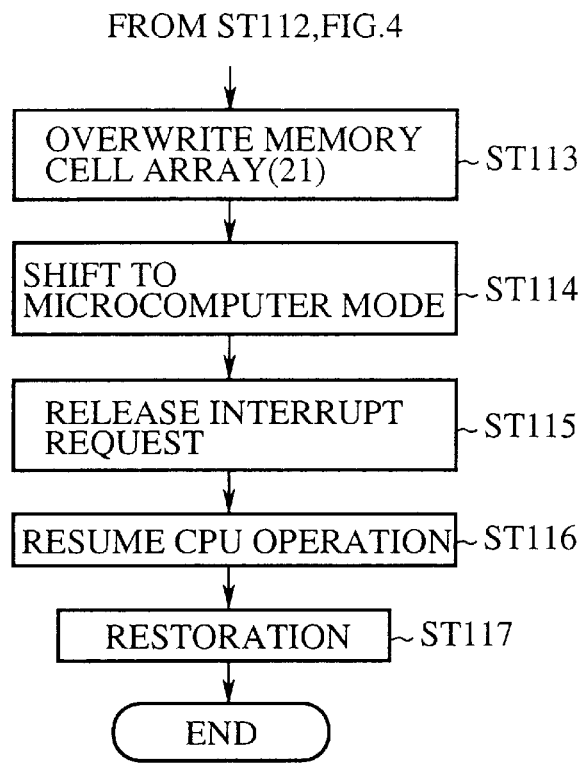
FIG. 5 is another flowchart showing a memory overwrite process performed when data dissipation is detected according to the first embodiment.

FIGS. 4 and 5 are flowcharts showing a memory overwrite process performed when data dissipation is detected. Data "0" is written in all of the cells in the memory cell array 21. When the threshold level drops below the equilibrium point 212 in any one of the memory cells constituting the memory cell array 21, the sense amplifier 23 detects data dissipation in step ST101 of FIG. 4. In step ST102, the sense amplifier 23 outputs the data dissipation detection signal 121 to the data dissipation/interrupt request release block 25d of the memory overwrite control circuit 25 and also to the interrupt control circuit 24.

Here it is assumed that the threshold level, which produces the read-"0" operation in the memory cell array 6 and the memory cell arrays 21, begins to drop due to data dissipation. Since the memory cell array 6 and the memory cell array 21 have the same characteristic, dropping of the threshold level occurs at the same speed. The equilibrium point for the sense amplifier 23 between the read-"1" operation and the read-"0" operation resides at a higher level than that of the sense amplifier 10 so that the sense amplifier 23 is capable of detecting data dissipation and outputting the data dissipation detection signal in advance of reading wrong data by the sense amplifier 10 due to data dissipation in the memory cell array 6.

In step ST103, the interrupt control circuit 24 receiving the data dissipation detection signal 121 outputs the interrupt signal 122 to the CPU 1 and provides the interrupt process acknowledge signal 127a to the data dissipation/interrupt request release block 25d. In step ST104, the CPU 1 acknowledges the interrupt signal 122 from the interrupt control circuit 24 and stops its operation. In step ST105, the memory overwrite control circuit 25 enters an automatic memory rewriting process.

In step ST106, the clock/address request signal generation block 25c of the memory overwrite control circuit 25 outputs the clock generation request signal 123c to the clock generation circuit 15 so that the clock generation circuit 15 stops supplying the clock signal 110 to the CPU 1 and outputs the clock signal 108. The clock/address request signal generation block 25c receiving the clock signal 108 from the clock generation circuit 15 outputs the automatic address generation request signal 123d to the automatic address generation circuit 26 and the address data switching circuit 27. The automatic address generation circuit 26 outputs the address data 124 to the automatically generated address data 124 indicated the head of the memory cell array 6 to the address data switching circuit 27, and also provides the confirmation address data 125 to the clock generation circuit 15 and to the clock/address request signal generation block 25c of the memory overwrite control circuit 25. The address data switching circuit 27 receives the automatically generated address data 124 indicating the head of the memory cell 6 from the automatic address generation circuit 26 and outputs the same as the address data 126 to the selector decoder 8 and the word line decoder 7.

In step ST107, the read signal generation block 25a of the memory overwrite control circuit 25 outputs the read request signal 123a to the memory control signal generation circuit 14. The memory control signal generation circuit 14 provides the memory control signal 106 for a read operation to the write/read/erasure control circuit 16. The write/read/erasure control circuit 16 commands the sense amplifier 10 to read 1-byte data at the head of the memory cell array 6.

In step ST108, the write/read/erasure control circuit 16 receiving the data 111 read by the sense amplifier 10 transfers the data 112 to the data latch 11. The data latch 11 latches the 1-byte data 112 in response to the data latch request signal 128 from the read signal generation block 25a.

In step ST109, the memory control signal generation circuit 14 provides the memory control signal 106 for a write operation to the write/read/erasure control circuit 16, in response to the write request signal 123b from the write signal generation block 25b of the memory overwrite control circuit 25. In step ST110, the write/read/erasure control circuit 16 writes 1-byte data latched in the data latch 11 in the same address in the memory cell array 6 as the address read in step ST107.

When the 1-byte data has been written, the clock/address request signal generation block 25c of the memory overwrite control circuit 25 provides the automatic address generation request signal 123d to the automatic address generation circuit 26 and the address data switching circuit 27 so that the automatic address generation circuit 26 increments the address. In step ST112, steps ST107 through ST111 (the read operation and the write operation) are executed until the last address is reached.

When the overwriting of the memory cell array 6 is completed, the write/read/erasure control circuit 16 overwrites the memory cell array 21 with data "0" in step ST113. In step ST114, the overwrite control circuit 25 shifts from the memory overwrite process mode to the microcomputer mode.

After shifting to the microcomputer mode, in step ST115, the data dissipation/interrupt request release block 25d of the memory overwrite control circuit 25 provides the interrupt process release request signal 127b to the interrupt control circuit 24. The interrupt control circuit 24 cancels the interrupt signal 122 hitherto provided to the CPU 1. The clock/address request signal generation block 25c of the memory overwrite control signal 25 stops generating the clock generation request signal 123c and the automatic address generation request signal 123d.

In step ST116, the clock generation circuit 15 acknowledges the absence of the clock generation request signal 123c from the clock/address request signal generation block 25c of the memory overwrite control circuit 25 and frequency-divides the external clock signal 109. The clock signal 110 thus obtained is output to the CPU 1 so that the CPU 1 resumes its operation. The normal operation is restored in step ST117.

As described above, the first embodiment provides an advantage in that the sense amplifier 23 is capable of detecting data dissipation in advance of reading of wrong data from the memory cell array 6, by reading data from the memory cell array 21 at an equilibrium point higher than that of the sense amplifier 10 for the memory cell array 6. In response to the detection of data dissipation, the memory cell array 6 is overwritten. In this way, the reliability of the data stored in the memory cell array 6 is improved without having to stop the operation of the entirety of the memory control circuit.

Second embodiment

Figure 6:
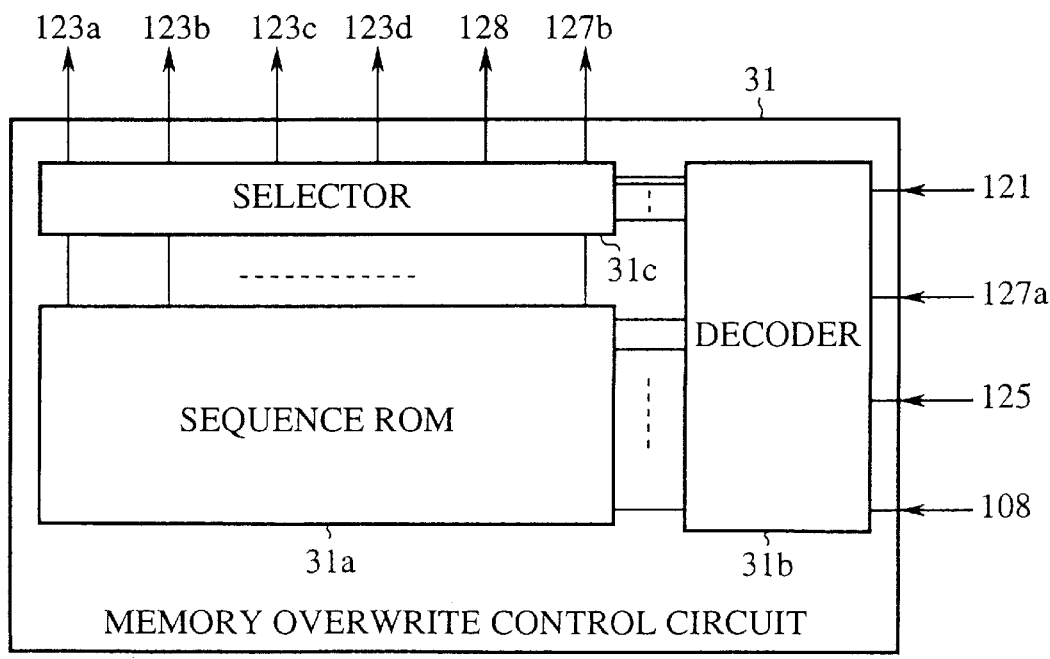
FIG. 6 shows a construction of a memory overwrite control circuit according to a second embodiment of the present invention.

FIG. 6 shows a construction of a memory overwrite control circuit 31 according to the second embodiment. The memory control circuit according to the second embodiment is constructed such that the memory overwrite control circuit 25 of the first embodiment shown in FIG. 1 is replaced by the memory overwrite control circuit 31 constructed of a sequence ROM circuit. Referring to FIG. 6, numeral 31a indicates a sequence ROM that includes the functions of the read signal generation block 25a, the write signal generation block 25b, the clock/address request signal generation block 25c and the data dissipation/interrupt request release block 25d of the memory overwrite control circuit of the first embodiment.

Referring again to FIG. 6, numeral 316 indicates a decoder for receiving the data dissipation detection signal from the sense amplifier 23, the interrupt process acknowledge signal 127a from the interrupt control circuit 24, the address data 125 from the automatic address data generation circuit 26 and the clock signal 108 from the clock generation circuit 15.

Referring again to FIG. 6, numeral 31c indicates a selector for selecting one of the read request signal 123a, the write request signal 123b, the clock generation request signal 123c, the automatic address generation request signal 123d, the data latch request signal 128 and the interrupt process release request signal 127b from the sequence ROM 31a.

A description will now be given of the memory control circuit according to the second embodiment.

Compared to the memory overwrite control circuit 25 of the first embodiment constructed of the read signal generation block 25a, the write signal generation block 25b, the clock/address request signal generation block 25c and the dissipation/interrupt request release block 25d, the memory control circuit according to the second embodiment using the sequence ROM 31a is more simplified in that the circuit is not built of blocks, and the number of logic elements and space requirement is reduced.

Accordingly, the second embodiment provides an advantage that the reliability of the data stored in the memory cell array 6 is improved using a simple construction, by constructing the memory overwrite control circuit 31 of the sequence ROM 31a.

Third embodiment

Figure 7:
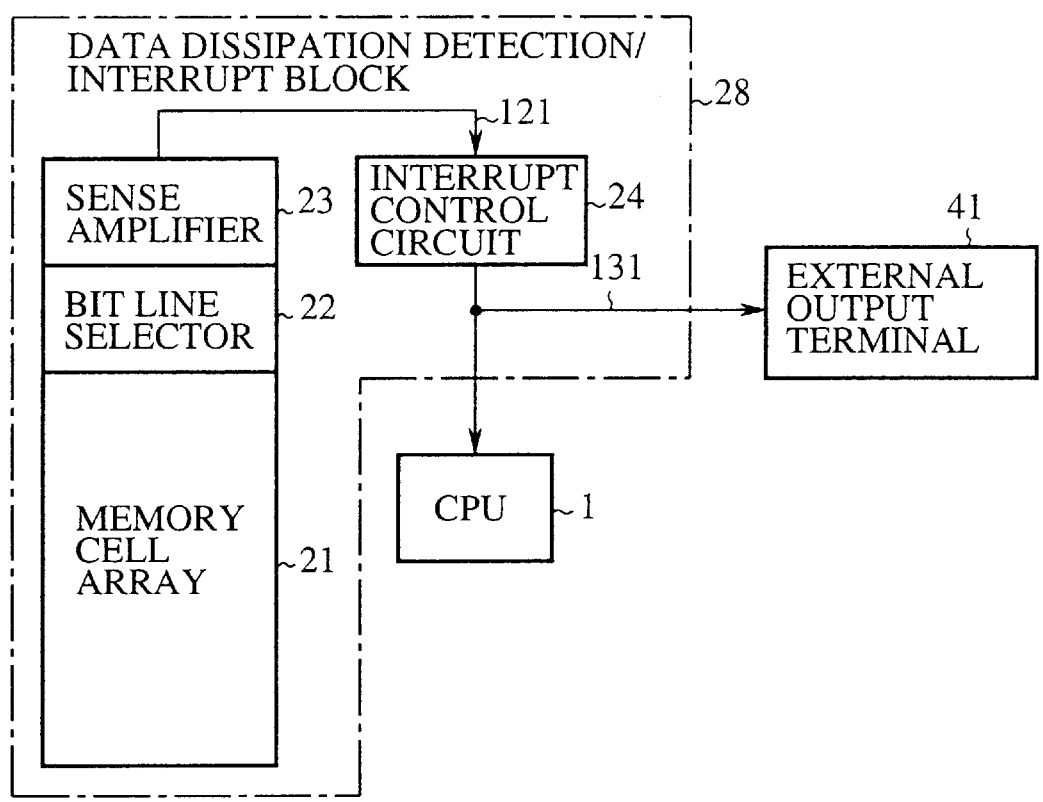
FIG. 7 shows a construction of a memory control circuit according to a third embodiment of the present invention.

FIG. 7 shows a part of the construction of the memory control circuit according to the third embodiment. Referring to FIG. 7, numeral 41 indicates external output terminals. The other aspects of the memory control circuit are the same as the corresponding aspects of the first embodiment shown in FIG. 1.

A description will now be given of the third embodiment.

In the first embodiment, upon detection of data dissipation, the interrupt control circuit 24 outputs the interrupt signal 122 only to the CPU 1 so as to initiate an interrupt process. In the third embodiment, the interrupt signal 122 is also output to the external output terminal 41 so that external peripheral devices connected to the memory are notified of occurrence of data dissipation. In this way, the external peripheral devices is capable of stopping their operation or executing an interrupt process appropriately.

As has been detected, the sense amplifier 23 is capable of detecting data dissipation in advance of reading of wrong data from the memory cell array 6, by reading data from the memory cell array 21 at an equilibrium point higher than that of the sense amplifier 10 for the memory cell array 6. In response to the detection of data dissipation, the memory cell array 6 is overwritten. In this way, the reliability of the data stored in the memory cell array 6 is improved without having to stop the operation of the entirety of the memory control circuit. In addition, by causing the interrupt control circuit 24 to output the interrupt signal 122 to the external peripheral devices, the external peripheral devices are capable of stopping its operation or executing an interrupt process appropriately.

Fourth embodiment

The construction of the memory control circuit according to the fourth embodiment is the same as that of the first embodiment. In the first embodiment, detection of data dissipation occurs while the CPU 1 is processing data. This means that the CPU power is wasted in unnecessary data processing. According to the fourth embodiment, data dissipation is detected and a memory overwrite process is performed at power-on, that is, before the CPU 1 starts processing data.

A description will now be given of the operation of the fourth embodiment.

Figure 8:
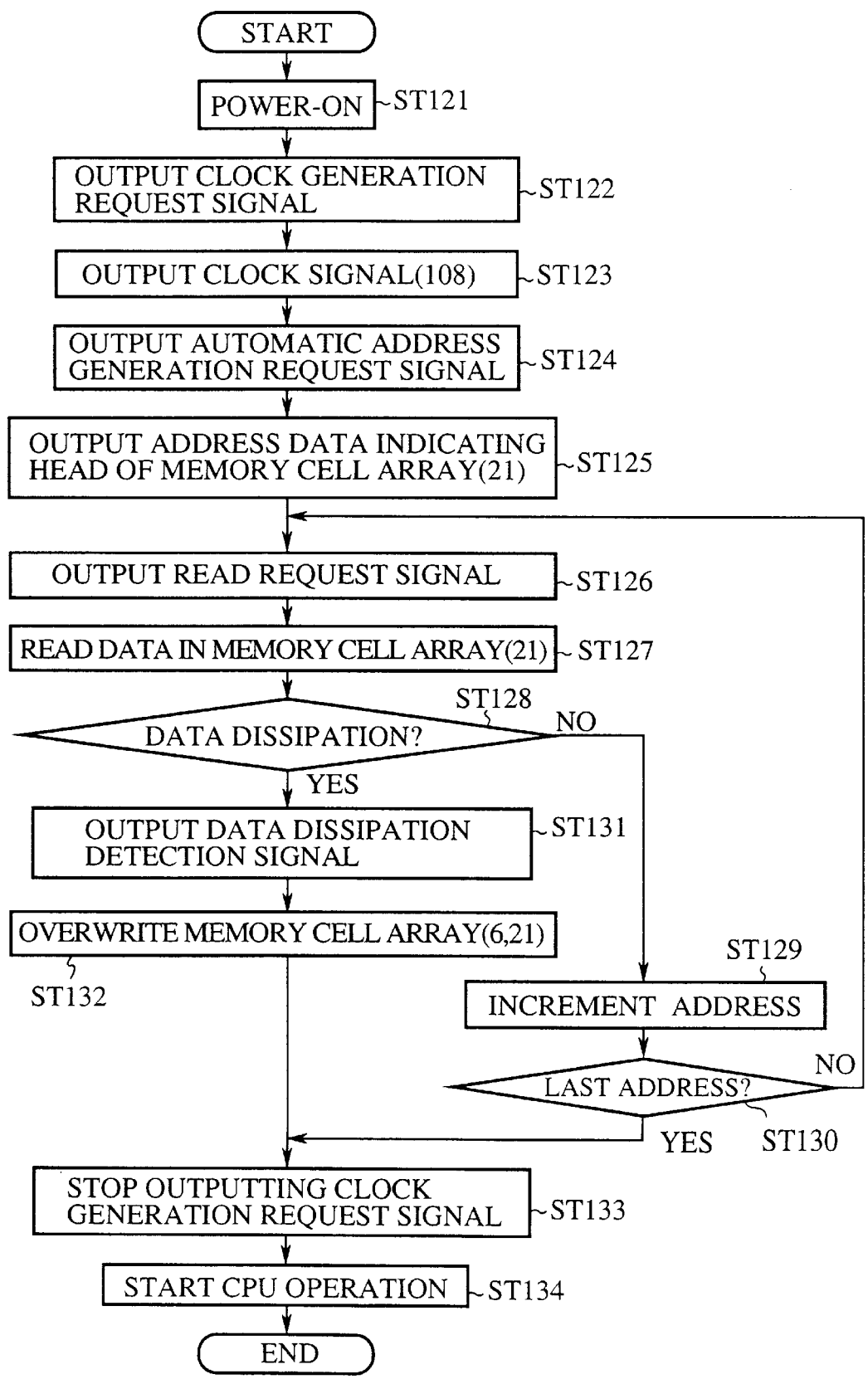
FIG. 8 is a flowchart showing a memory overwrite process at power-on according to a fourth embodiment of the present invention.

FIG. 8 is a flowchart showing a memory overwrite process at power-on. The power of the memory control circuit is turned on in step ST121. In step ST122, the clock/address request signal generation block 25c of the memory overwrite control circuit 25 outputs the clock generation request signal 123c to the clock generation circuit 15. In step ST123, the clock generation circuit 15 outputs the clock signal 108 to the memory overwrite control circuit 25. Since the clock generation circuit 15 does not supply the clock signal 110 to the CPU 1, the CPU 1 does not start its operation.

In step ST124, the clock/address request signal generation block 25c receiving the clock signal 108 from the clock generation circuit 15 outputs the automatic address generation request signal 123d for generating the address data indicating the head of the memory cell array 21, to the automatic address generation circuit 26 and the address data switching circuit 27. In step ST125, the address data indicating the head of the memory cell array 21 is generated by the automatic address generation circuit 26 and output from the address switching circuit 27.

In step ST126, the read signal generation block 25a of the memory overwrite control circuit 25 outputs the read request signal 123a to the memory control signal generation circuit 14. The memory control signal generation circuit 14 outputs the memory control signal 106 for a read operation to the write/read/erasure control circuit 16. In step ST127, the sense amplifier 23 reads the data at the head of the memory cell array 21 in accordance with the instruction provided by the write/read/erasure control circuit 16.

In step 128, a determination is made as to whether the sense amplifier 23 detects data dissipation. If the sense amplifier 23 does not detect data dissipation, the address in the memory cell array 21 is incremented in step ST129. In step ST130, a determination is made as to whether the last address is reached. If the last address is not reached, steps ST126 through ST128 are repeated. If the sense amplifier 23 detects data dissipation in step ST128, control is turned to step ST131 where sense amplifier 23 outputs the data dissipation detection signal 121 to the memory overwrite control circuit 25.

In step ST132, the memory overwrite control circuit 25 receiving the data dissipation detection signal 121 executes a memory overwrite process in the memory cell arrays 6 and 21. This process is the same as steps ST106 through ST113 in FIGS. 4 and 5.

When it is determined in step ST130 that the last address is reached or when the memory overwrite process in step ST132 is completed, control is turned to step ST133 where the clock/address request signal generation block 25c of the memory overwrite control circuit 25 stops supplying the clock generation request signal 123c and the automatic address generation request signal 123d. In step ST134, the clock generation circuit 15 supplies the clock signal 110 to the CPU 1 in response to the cancellation of the clock generation request signal 123c so that the CPU 1 resumes its normal data processing.

As has been described, according to the fourth embodiment, the sense amplifier 23 detects data dissipation by reading data from the memory cell array 21 at a relatively high equilibrium point. When the sense amplifier 23 detects data dissipation, the data in the memory cell array 6 is overwritten. In this way, waste of the CPU power in unnecessary data processing is prevented and the reliability of the data stored in the memory cell array 6 is improved.

Fifth embodiment

The construction of the memory control circuit according to the fifth embodiment is the same as that of the first embodiment shown in FIG. 1. According to the fifth embodiment, the memory overwrite process is performed while a program is being executed.

A description will now be given of the operation of the fifth embodiment.

Figure 9:
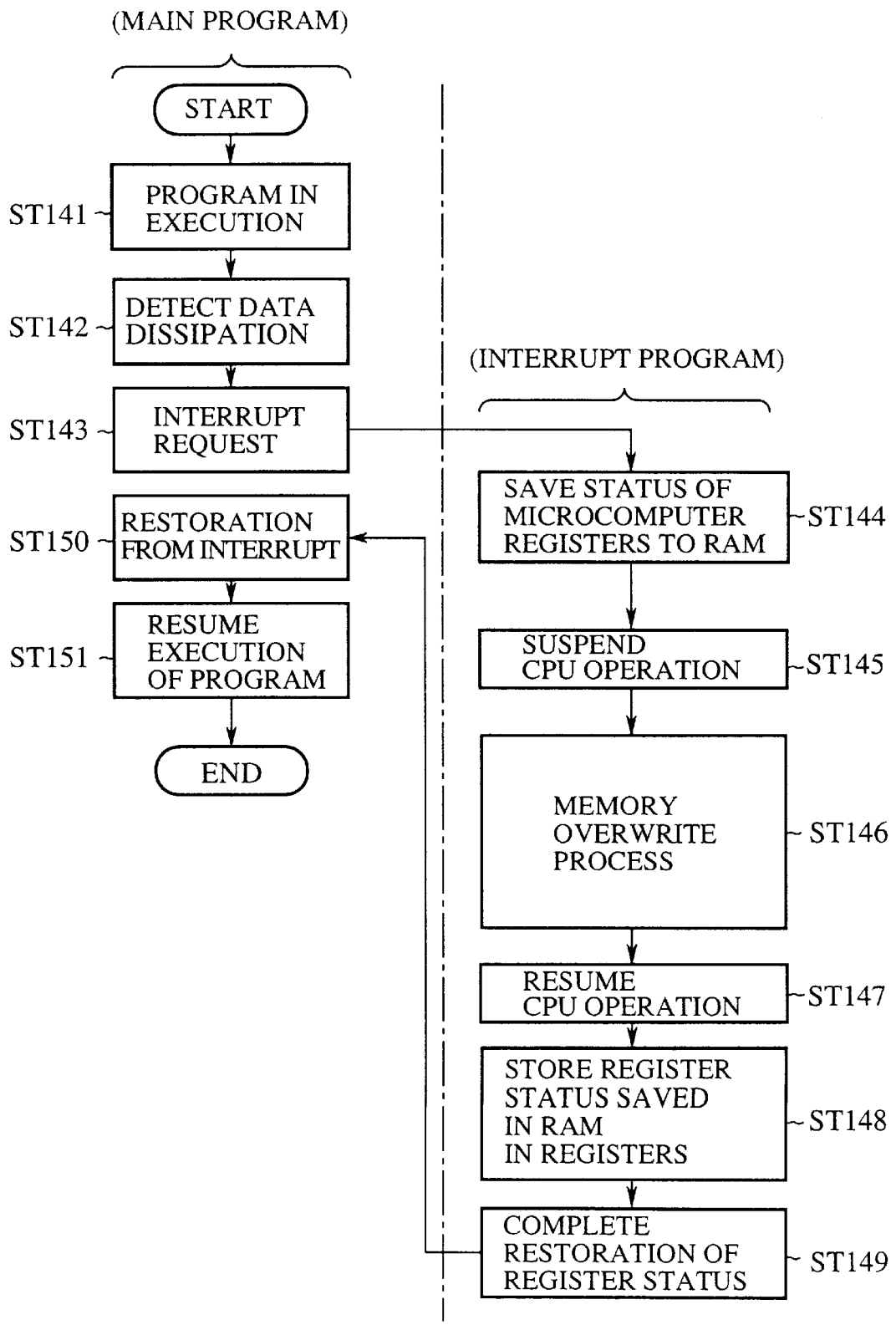
FIG. 9 is a flowchart showing a memory overwrite process performed when data dissipation is detected according to a fifth embodiment of the present invention.

FIG. 9 is a flowchart showing the memory overwrite process performed according to the fifth embodiment when data dissipation is detected. When data dissipation is detected in the memory cell array 21 while a main program is being executed, an interrupt process is initiated and the CPU 1 operation is suspended. Subsequently, a data overwrite process is performed in the memory cell arrays 6 and 21. The CPU 1 operation is resumed and execution of the main program is restarted. The interrupt program is automatically executed as a result of an interrupt request in step ST143.

Referring to FIG. 9, while the main program is being executed in step ST141, the sense amplifier 23 detects data dissipation in step ST142. In step ST143, the interrupt control circuit 24 issues an interrupt request to the CPU 1 so that the CPU executes an interrupt program.

In step ST144, under the control of the interrupt program, the CPU 1 saves the statuses of the registers (not shown in FIG. 1) occurring when the interrupt request is issued in step ST143, to a random access memory or the like (not shown in FIG. 1). In step ST145, the CPU 1 stops its operation in response to the interrupt signal 122 from the interrupt control circuit 24. In step ST146, the CPU 1 performs the automatic overwrite process in the memory cell arrays 6 and 21. This process is the same as steps ST105 through ST115 in FIGS. 4 and 5.

In step ST147, the CPU 1 resumes its operation in response to the cancellation of the interrupt signal 122 from the interrupt control circuit 24. In step ST148, the CPU 1 restores the statuses saved in the random access memory or the like in the registers. In step ST149, restoration of the register statuses is completed. In step ST150, the CPU 1 returns from the interrupt program to the main program. In step ST151, execution of the main program is restarted. Thus, the memory overwrite process is performed without changing the operating status of the memory control circuit even when data dissipation is detected.

As has been described, according to the fifth embodiment, when data dissipation is detected while a main program is being executed, the CPU 1 saves the statuses of the registers at that point of time and suspends its operation. After the memory overwrite process is completed, the CPU 1 resumes its operation and stores the saved statuses in the registers before returning to the main program. In this manner, the reliability of the data stored in the memory cell array 6 is improved without changing the operating condition of the memory control circuit when data dissipation is detected.

Sixth embodiment

Figure 10:
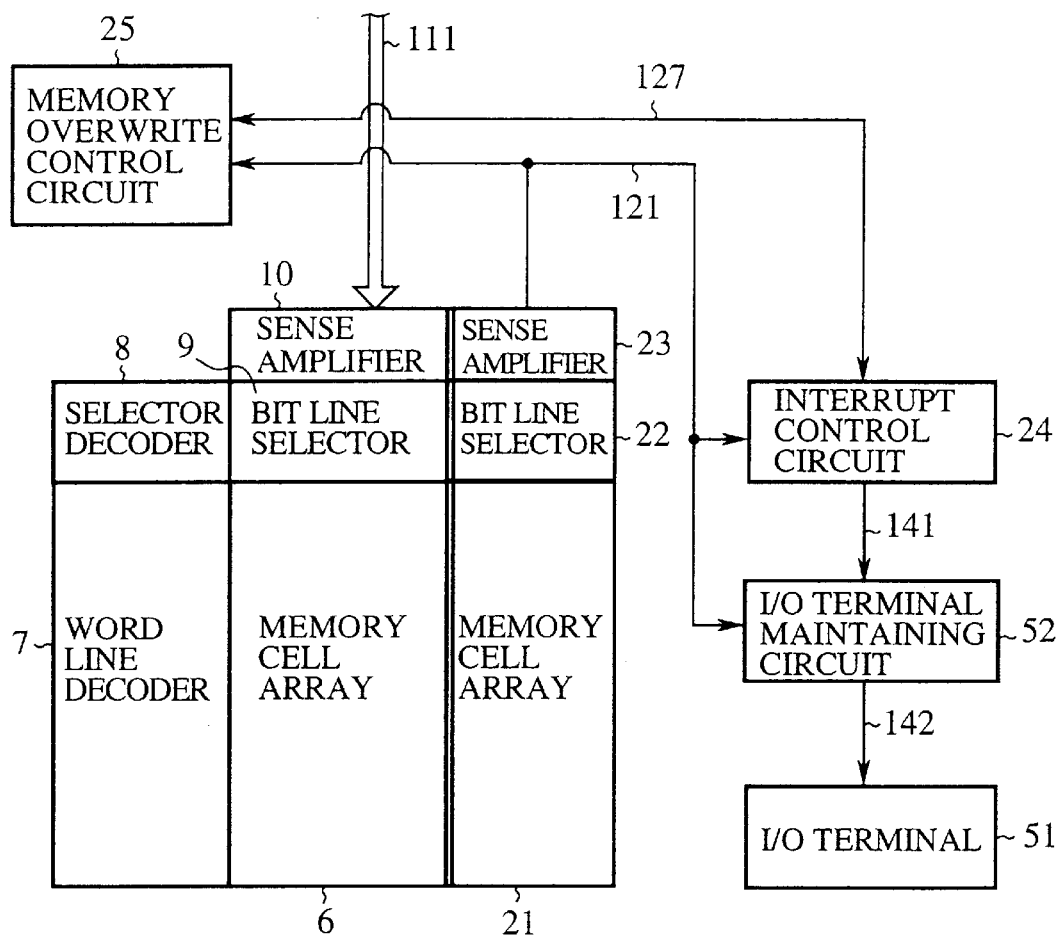
FIG. 10 shows a construction of a memory control circuit according to a sixth embodiment of the present invention.

FIG. 10 shows a part of the construction of the memory control circuit according to the sixth embodiment. Referring to FIG. 10, numeral 51 indicates input/output terminal of the memory control circuit, and 52 indicates an input/output terminal freezing circuit for outputting, in response to the data dissipation detection signal 121 from the sense amplifier 23, an input/output terminal freezing signal 142 for fixing the connection status of the input/output terminal 51 with respect to an external peripheral device. The other aspects of the construction are the same as the corresponding aspects of the first embodiment shown in FIG. 1.

A description will now be given of the operation of the sixth embodiment.

Upon detection of data dissipation in the memory cell array 21, the sense amplifier 23 outputs the data dissipation detection signal 121 to the memory overwrite control circuit 25, the interrupt control circuit 24 and the input/output terminal freezing circuit 52. The interrupt control circuit 24 suspends the operation of the CPU 1 (not shown), and the memory overwrite control circuit 25 performs an overwrite process in the memory cell array 6. The input/output terminal freezing circuit 52 outputs the input/output terminal freezing signal 142 to the input/output terminal 51 so that the input/output terminal 51 with respect to the external peripheral device is fixed to a connection status that obtains when the data dissipation is detected.

When the memory overwrite process is completed, the interrupt control circuit 24 outputs an input/output terminal control signal 141 to the input/output terminal freezing circuit 52. Thereupon, by canceling the input/output terminal freezing signal 142, the input/output terminal freezing circuit 52 cancels freezing of the connection status of the input/output terminal 51 with respect to the external peripheral device. In this way, the memory overwrite process is performed without affecting the external peripheral device.

As has been described, according to the sixth embodiment, by fixing the connection status of the input/output terminal 51 with respect to the external peripheral device, the reliability of the data stored in the memory cell array 6 is improved without changing the connection status with respect to the external peripheral device that obtains when data dissipation is detected.

Seventh embodiment

Figure 11:
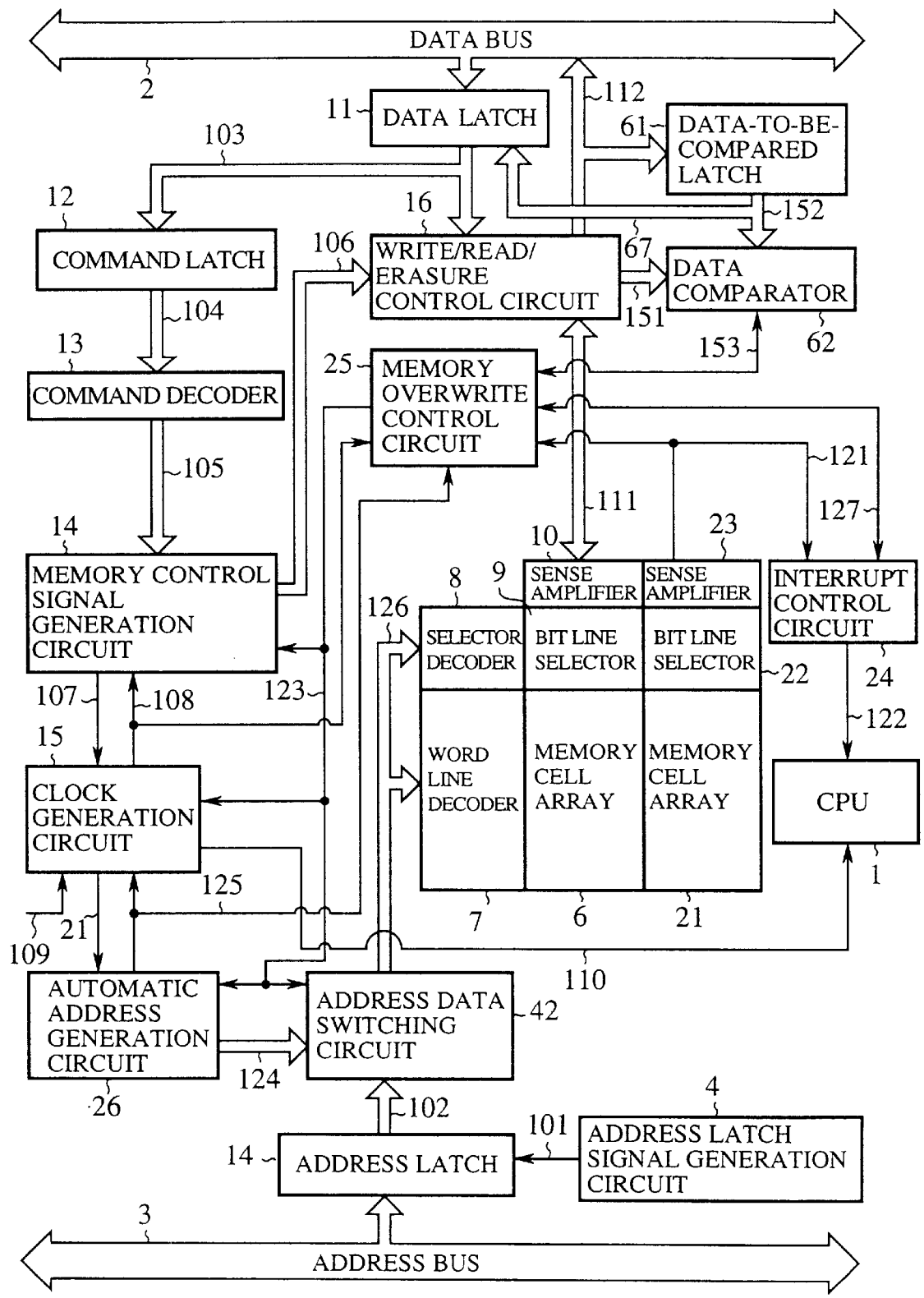
FIG. 11 shows a construction of a memory control circuit according to a seventh embodiment of the present invention.

FIG. 11 shows the construction of the memory control circuit according to the seventh embodiment. Referring to FIG. 11, numeral 61 indicates a data-to-be-compared latch for storing 1-byte data read from the memory cell array 6 by the sense amplifier 10 which is set to a normal equilibrium point, that is, set to the characteristic curve 204 of FIG. 2. Numeral 62 indicates a data comparator for comparing, in response to a comparison control signal 153 from the memory overwrite control circuit 25, the data read from the memory cell array 6 when the sense amplifier 10 is set to the normal equilibrium point, that is, set to the normal characteristic curve 204 of FIG. 2, with the data read from the memory cell array 6 when the sense amplifier 10 is set to an equilibrium point higher than the normal equilibrium point, that is, for example, set to the normal characteristic curve 214 of FIG. 2. Setting of the sense amplifier 10 to an equilibrium point is conducted by controlling the power supply voltage thereof. The other aspects of the construction are the same as the corresponding aspects of the first embodiment shown in FIG. 1.

A description will now be given of the operation of the seventh embodiment.

Figure 12:
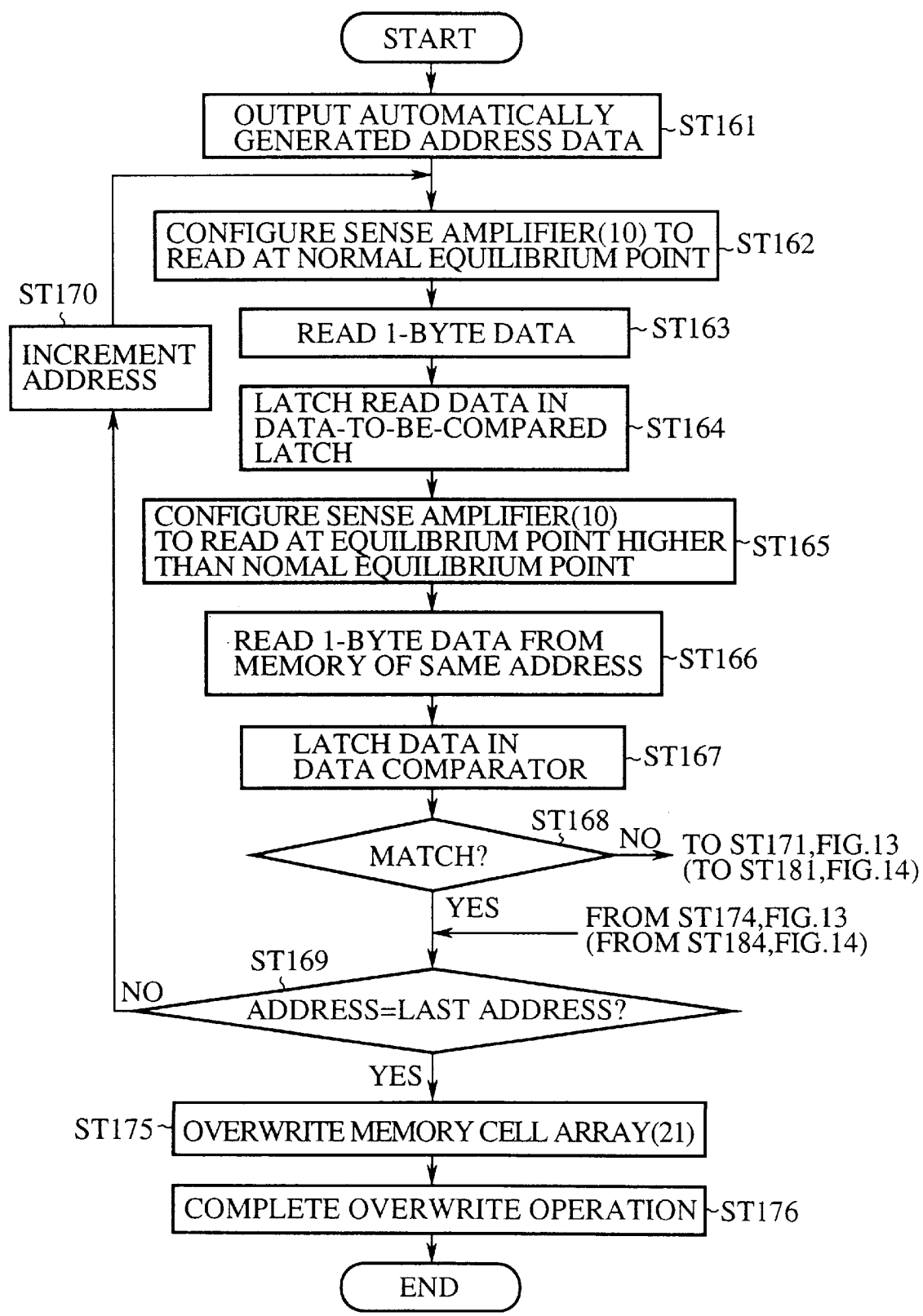
FIG. 12 is a flowchart showing a memory overwrite process when data dissipation is detected according to the seventh embodiment.
Figure 13:
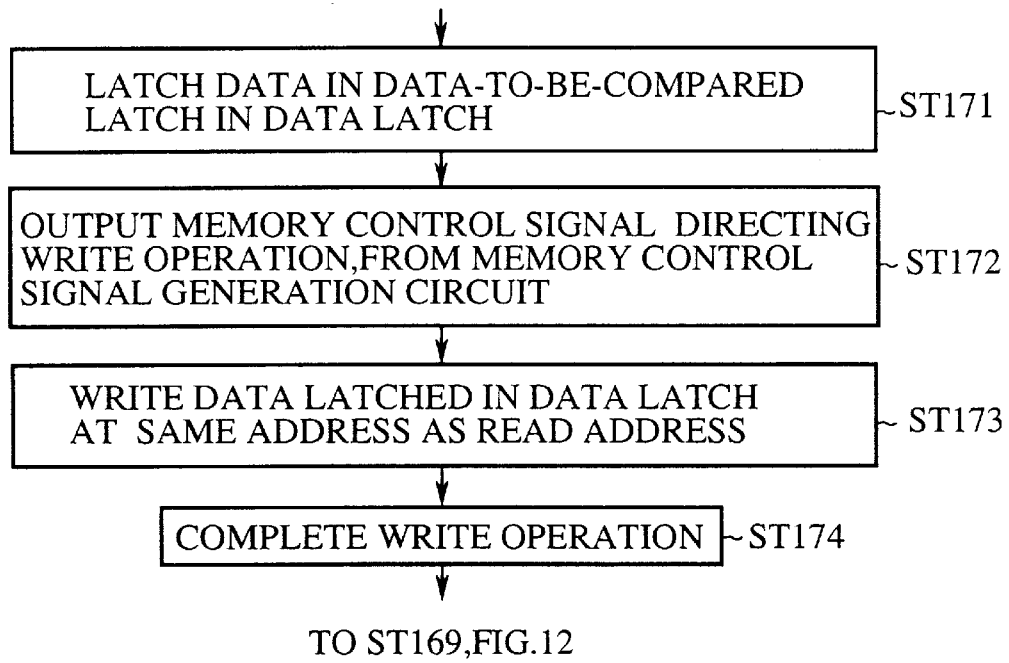
FIG. 13 is another flowchart showing a memory overwrite process performed when data dissipation is detected according to the seventh embodiment.

FIGS. 12 and 13 are flowcharts showing the memory overwrite process according to the seventh embodiment when data dissipation is detected. Detection of data dissipation and shifting to the automatic overwrite mode are the same as those of the first embodiment. In the seventh embodiment, only the data at the address in which data dissipation is likely to occur is overwritten.

In step ST161, the automatic address generation circuit 26 outputs the automatically generated address data 124. The address data switching circuit 27 outputs the automatically generated address data 124 as the address data 126. In step ST162, the sense amplifier 10 is set to the normal equilibrium point for a read operation. In step ST163, the sense amplifier 10 reads 1-byte data from the memory cell array 6 in response to an instruction provided by the write/read/erasure control circuit 16. In step ST164, the write/read/erasure control circuit 16 latches the read data 112 in the data-to-be-compared latch 61.

In step ST165, the sense amplifier 10 is set to an equilibrium point higher than the normal equilibrium point for a read operation. In step ST166, the sense amplifier 10 reads again from the same address in the memory cell array 6 at the higher equilibrium point, in response to an instruction provided by the write/read/erasure control circuit 16.

In step ST167, the write/read/erasure control circuit 16 latches the read data in the data comparator 62. In step ST168, the data comparator 62 compares, in response to the comparison control signal 153 provided by the memory overwrite control circuit 25, the data latched therein with the data 152 latched in the data-to-be-compared latch 61. The result of data comparison is delivered to the memory overwrite control circuit 25 in response to the comparison control signal 153. When the data match, it is determined that data dissipation does not occur and it is not necessary to perform an overwrite process. In step ST169, a determination is made as to whether the last address is reached. If the last address is not reached, the automatic address generation circuit 26 increments the address in step ST170. The data in the memory cell array 6 is read and a comparison is performed as described above until the last address is reached.

If it is determined in step ST168 that the data does not match, it is considered that the threshold level in that particular address in the memory cell array 6 resides between the characteristic curve 204 and the characteristic curve 214 of FIG. 2 so that data dissipation occurs in that address. It is determined that the data read from the memory cell array 6 at the normal equilibrium point is the original data. In step ST171 of FIG. 13, the 1-byte data 152 read from the memory cell array 6 at the normal equilibrium point and latched in the data-to-be-compared latch 61 is latched in the data latch 11, in response to the comparison control signal 153.

In step ST172, the memory control signal generation circuit 14 outputs the memory control signal 106 for a write operation to the write/read/erasure control circuit 16. In step ST173, the write/read/erasure control circuit 16 writes 1-byte data latched in the data latch 11, in the same address as the read address. Instep ST174, the memory overwrite control circuit 25 completes the write operation.

When the data write operation is completed, a determination is made as to whether the last address is reached in step ST169. When the last address is not reached, the address is incremented so that the comparison continues to be performed until the last address is reached. When the comparison of the data read from the last address is completed, the write/read/erasure control circuit 16 overwrites the data in the memory cell array 21 and completes the overwrite process in step ST176. According to the process described above, the overwriting is performed only in those memory cells in which data dissipation is likely to occur so that degeneration of the other memory cells by unnecessary pulses is prevented.

Thus, according to the seventh embodiment, when the sense amplifier 23 detects data dissipation, the data that the sense amplifier 10 reads from the address in the memory cell array 6 at the normal equilibrium point is compared with the data that the sense amplifier 10 reads from the same address at an equilibrium point higher than the normal equilibrium point. Upon determination that the data differ, the data read at the normal equilibrium point is overwritten only in those cells in which data dissipation is likely to occur. In this way, the reliability of the data stored in the memory cell array 6 is improved. By preventing unnecessary write pulses from being applied to the other addresses, degradation of the memory is prevented.

Eighth embodiment

The construction of the memory control circuit according to the eighth embodiment is the same as that of the seventh embodiment shown in FIG. 11.

A description will now be given of the operation of the eighth embodiment.

Figure 14:
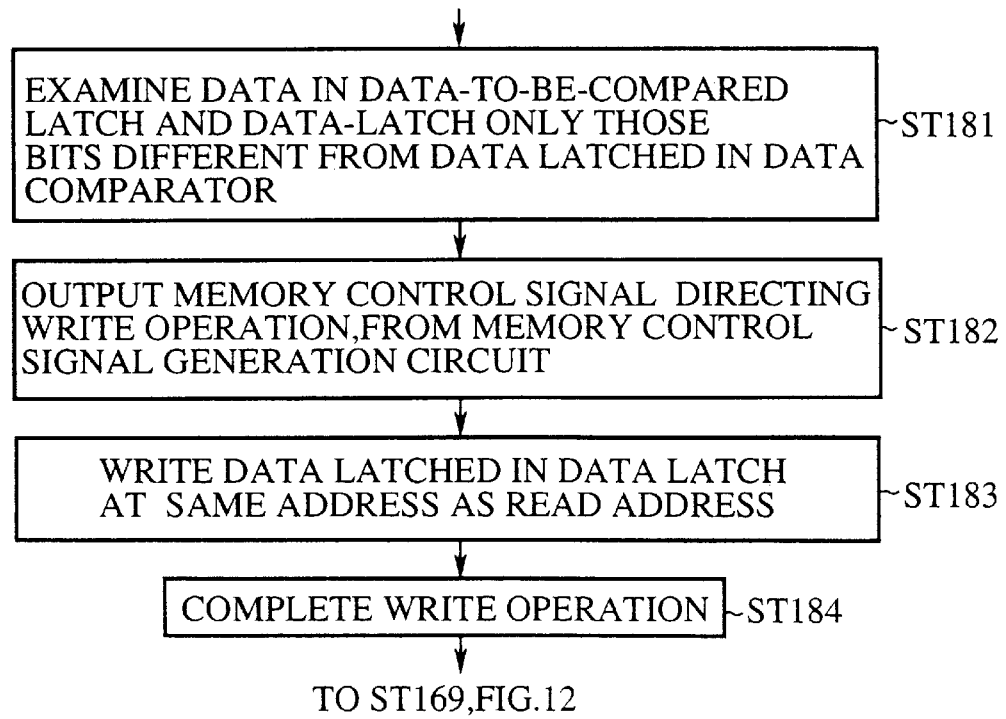
FIG. 14 is a flowchart showing a memory overwrite process performed when data dissipation is detected according to an eighth embodiment of the present invention.
Figure 15:
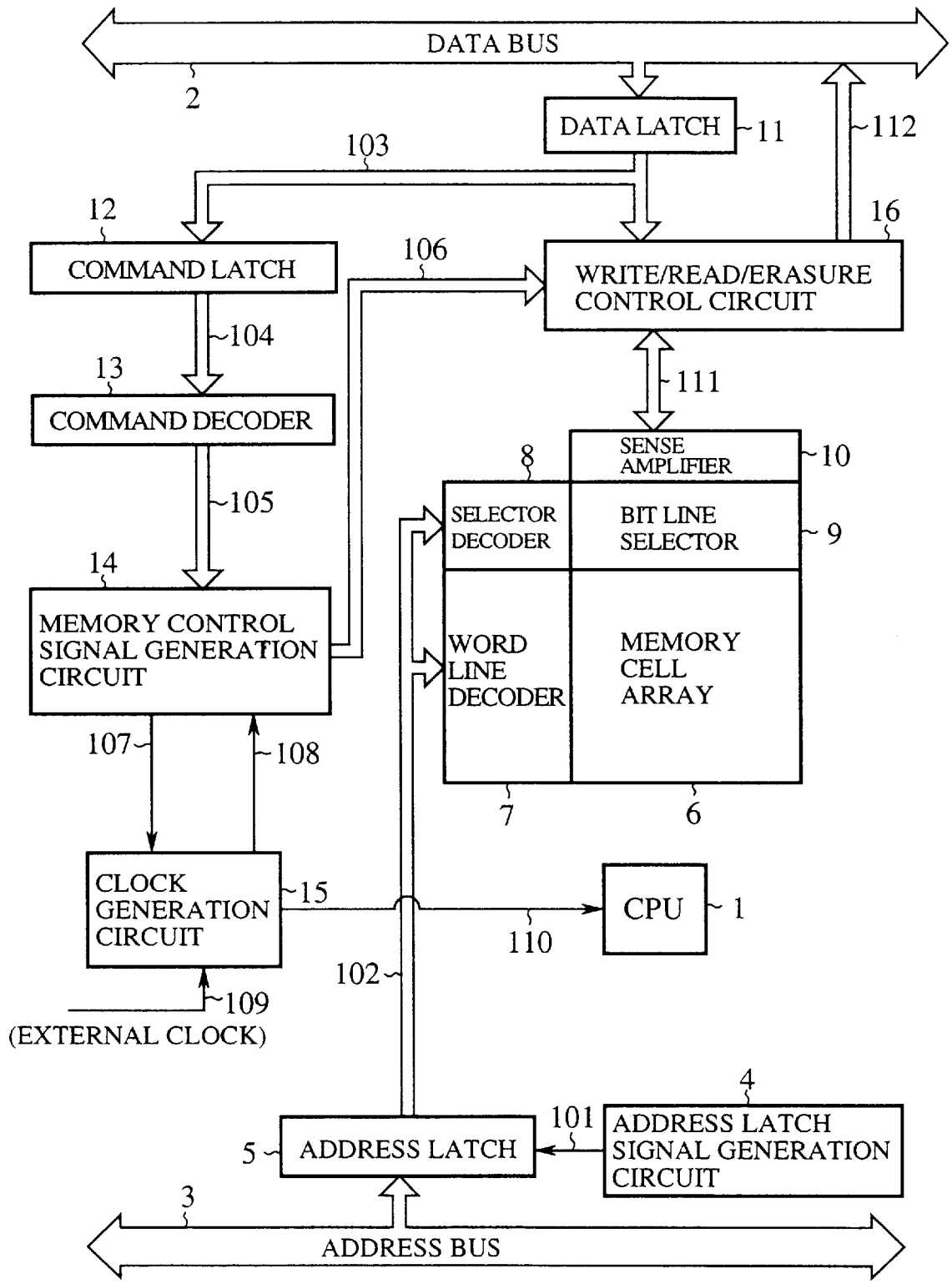
FIG. 15 shows a construction of a memory control circuit according to the related art.

FIG. 14 is a flowchart showing an overwrite process according to the eighth embodiment when data dissipation is detected. Steps ST181 through ST184 correspond to steps ST171 through ST174 in FIG. 13. The other steps are the same as the corresponding ones of steps ST161 through ST176 in FIG. 12.

In step ST181, in response to the comparison control signal from the memory overwrite control circuit 25, only those bits of the 1-word data latched in the data-to-be-compared latch 61 that are different from the corresponding bits of the data latched in the data comparator 62 are latched in the data latch 11. That is, only those non-matching bits (bits that change from "0" to "1") are latched in the data latch 11. Steps ST182 through ST184 are the same as steps ST172 through ST174 of FIG. 13.

With the above-described process, stress caused by a write operation in the memory cell array 6 is properly controlled because those bits that do not exhibit data dissipation are not overwritten.

According to the eighth embodiment, when the sense amplifier 23 detects data dissipation, the data read by the sense amplifier 10 from an address in the memory cell array 6 at the normal equilibrium point is compared with the data read by the sense amplifier 10 from the same address at an equilibrium point higher than that of the normal equilibrium point. If the data do not match, only those bits of the data read at the normal equilibrium point that are different from the corresponding bits of the data read at the higher equilibrium point are overwritten in the respective addresses. In this way, the combined advantage of improving the reliability of the data stored in the memory cell array 6 and preventing degradation of the memory cell array 6 is obtained. The latter advantage results from performing a bit-by-bit overwriting operation at those addresses that exhibit data dissipation and thus by preventing unnecessary write pulses from being applied to the other addresses.

The present invention is not limited to the above-described embodiments, and variations and modifications may be made without departing from the scope of the present invention.

What is claimed is:

1. A memory control circuit comprising:

a CPU for executing a predetermined process;

a first memory cell array storing data necessary for the predetermined process executed by said CPU;

a first sense amplifier reading the data stored in the first memory cell array at a first equilibrium point between a read-"0" operation and a read-"1" operation;

a write/read/erasure control circuit for controlling a data write operation, a data read operation and a data erasure operation in the first memory cell array;

a second memory cell array having the same characteristic as said first memory cell array and storing predetermined data;

a second sense amplifier for reading the data stored in said second memory cell at a second equilibrium point higher than the first equilibrium point so as to detect data dissipation;

an interrupt control circuit for outputting to said CPU an interrupt signal for suspending the predetermined process executed by said CPU, when said second sense amplifier detects data dissipation;

an automatic address generation circuit for successively generating addresses in said first memory cell array; and a memory overwrite control circuit for causing said automatic address generation circuit to generate the addresses in said first memory cell array when said second sense amplifier detects data dissipation, causing said write/read/erasure control circuit to overwrite each of the addresses generated by said automatic address generation circuit using data read from the same addresses by said first sense amplifier, canceling the interrupt signal provided by said interrupt control circuit, and resuming the predetermined process of said CPU.

2. The memory control circuit according to claim 1, wherein said write/read/erasure control circuit writes predetermined data in said second memory cell array when said second sense amplifier detects data dissipation.

3. The memory control circuit according to claim 1, wherein said memory overwrite control circuit comprises a sequence ROM.

4. The memory control circuit according to claim 1, wherein said interrupt control circuit outputs the interrupt signal to an external peripheral device.

5. The memory control circuit according to claim 1, wherein, at power-on, said memory overwrite control circuit prevents said CPU from starting its operation and data dissipation is detected by causing said automatic address generation circuit to successively generate addresses in said second memory cell array and causing said second sense amplifier to read data from said second memory cell array, whereupon said memory overwrite control circuit performs a memory overwrite process in said first memory cell array and said second memory cell array, and wherein when the memory overwrite process is completed, said memory overwrite control circuit instructs said CPU to start its operation.

6. The memory control circuit according to claim 1, wherein, when said second sense amplifier detects data dissipation while said CPU is executing a first process, said interrupt signal from said interrupt control circuit causes said CPU to save statuses of its registers and shift from the first process to a second process in which said CPU stops its operation, so that said memory overwrite control circuit performs a memory overwrite process in said first memory cell array, and wherein when the memory overwrite process is completed, said interrupt control circuit cancels the interrupt signal so that said CPU restarts its operation and the register statuses are restored in respective registers, so that said CPU returns from the second process to the first process.

7. The memory control circuit according to claim 1, further comprising an input/output terminal freezing circuit for freezing a connection status that occurs at an input/output terminal with respect to an external peripheral device, when said second sense amplifier detects data dissipation, and wherein said interrupt control circuit causes said input/output terminal freezing circuit to stop freezing the input/output terminal, when said memory overwrite control circuit cancels the interrupt signal.

8. The memory control circuit according to claim 1, further comprising a data comparator for comparing, when said second sense amplifier detects data dissipation, first data read by said first sense amplifier at the first equilibrium point from an address in said first memory cell array, with second data read by said first sense amplifier at a third equilibrium point higher than the first equilibrium point from said address, and wherein when the first data differs from the second data, said memory overwrite control circuit instructs said write/read/erasure control circuit to write the first data in said address.

9. The memory control circuit according to claim 8, wherein, when the second data has disagreeing bits that are different from corresponding bits in the first data, said memory overwrite control circuit instructs said write/read/erasure control circuit to overwrite the disagreeing bits with the corresponding bits.

* * * * *